(12) United States Patent
Igarashi

(10) Patent No.: US 8,590,561 B2
(45) Date of Patent: Nov. 26, 2013

(54) PRESSURE SENSOR, DIFFERENTIAL PRESSURE TYPE FLOW METER, AND FLOW RATE CONTROLLER

(75) Inventor: Hiroki Igarashi, Saitama (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 598 days.

(21) Appl. No.: 12/664,969

(22) PCT Filed: May 19, 2008

(86) PCT No.: PCT/JP2008/059141
§ 371 (c)(1),
(2), (4) Date: Mar. 4, 2010

(87) PCT Pub. No.: WO2009/001631
PCT Pub. Date: Dec. 31, 2008

(65) Prior Publication Data
US 2010/0154895 A1 Jun. 24, 2010

(30) Foreign Application Priority Data
Jun. 25, 2007 (JP) ................. 2007-166360

(51) Int. Cl.
*F16K 31/12* (2006.01)

(52) U.S. Cl.
USPC ...... 137/487; 137/487.5; 137/557; 73/861.52

(58) Field of Classification Search
USPC ............. 137/87.04, 485, 486.487, 487.5, 12, 137/557; 73/861.52–861.64
See application file for complete search history.

(56) References Cited

U.S. PATENT DOCUMENTS

| | | | | | |
|---|---|---|---|---|---|
| 3,600,945 | A | * | 8/1971 | Wenzel et al. | ............. 73/861.52 |
| 3,760,842 | A | * | 9/1973 | Mikiya | .......................... 137/557 |
| 4,466,290 | A | * | 8/1984 | Frick | .......................... 73/861.47 |
| 4,672,728 | A | * | 6/1987 | Nimberger | ..................... 137/884 |
| 4,896,541 | A | * | 1/1990 | Hughes | ....................... 73/861.52 |

(Continued)

FOREIGN PATENT DOCUMENTS

| | | |
|---|---|---|
| JP | 60-64219 A | 4/1985 |
| JP | 2005-233068 | 9/1993 |
| JP | 08-035896 | 2/1996 |

(Continued)

OTHER PUBLICATIONS

PCT/JP2008/059141: International Preliminary Report on Patentability dated Jan. 12, 2010.
International Search Report for PCT/JP2008/059141, date of mailing Jul. 15, 2008.

*Primary Examiner* — Eric Keasel
(74) *Attorney, Agent, or Firm* — Hamilton, Brook, Smith & Reynolds, P.C.

(57) ABSTRACT

A pressure sensor having a structure in which compressible fluid is prevented from stagnating in the vicinity of a pressure-receiving surface of the pressure sensor in the interior of a pressure introducing portion is provided. In a pressure sensor including a sensor body arranged in a pressure introduction flow channel branched in a T-shape upward from a primary fluid flow channel in which fluid to be subjected to pressure measurement flows, the pressure introduction flow channel includes an inclined surface extending in a direction to increase an opening area on the side of an inlet port of the fluid on a wall surface on the downstream side in terms of the direction of flow of the fluid.

3 Claims, 5 Drawing Sheets

(56) References Cited

U.S. PATENT DOCUMENTS

| | | | |
|---|---|---|---|
| 6,164,142 A * | 12/2000 | Dimeff | 73/861.52 |
| 6,578,435 B2 * | 6/2003 | Gould et al. | 73/861.52 |
| 6,672,173 B2 * | 1/2004 | Bell | 73/861.52 |
| 6,681,643 B2 * | 1/2004 | Heinonen | 73/861.52 |
| 7,100,454 B2 * | 9/2006 | Hasunuma | 73/715 |
| 7,270,143 B2 * | 9/2007 | Kohlmann et al. | 73/861.53 |
| 7,472,608 B2 * | 1/2009 | Hedtke | 73/861.63 |
| 7,878,980 B2 * | 2/2011 | Ricciardelli | 600/533 |

FOREIGN PATENT DOCUMENTS

| | | |
|---|---|---|
| JP | 11-211593 | 8/1999 |
| JP | 2005-164538 A | 6/2005 |
| JP | 2005-207946 A | 8/2005 |
| JP | 2005-221453 A | 8/2005 |
| JP | 2007-034667 A | 2/2007 |

* cited by examiner

PRESSURE SENSOR, DIFFERENTIAL PRESSURE TYPE FLOW METER, AND FLOW RATE CONTROLLER

This application is the U.S. National Stage of International Application No. PCT/JP2008/059141, filed May 19, 2008, which designates the U.S., published in Japanese, and claims priority under 35 U.S.C. §§119 or 365(c) to Japanese Application No. 2007-166360, filed Jun. 25, 2007.

TECHNICAL FIELD

The present invention relates to a pressure sensor, a differential pressure type flow meter, and a flow rate controller used in a fluid transport piping in various industrial fields such as chemical plants, semiconductor manufacturing, food, or biology.

BACKGROUND ART

In the related art, pressure sensors for measuring the pressure of fluid are widely used. The pressure sensors of this type include those used by being installed at a spot where the pressure of fluid containing corrosive chemical agents such as highly-refined nitric acid, hydrochloric acid, and hydrofluoric acid is measured as in a semiconductor manufacturing process, for example. More specifically, in a semiconductor manufacturing apparatus, chemical solution containing hydrofluoric acid or the like is used when performing an etching process on a semiconductor substrate, so that the pressure sensor is built in a circulation circuit for the chemical solution for ensuring stable supply of the chemical solution.

The pressure sensor of this type is provided at an end portion of a pressure introduction flow channel branched in a T-shape upward from a primary fluid flow channel in which fluid to be subjected to pressure measurement flows.

The pressure sensor as described above can be installed in pair in the primary fluid flow channel via an orifice and used as a flow meter which calculates the flow rate by converting the pressure difference between the both pressure sensors into the flow rate. Then, by controlling the flow rate calculated by the flow meter and the opening of a variable valve so as to eliminate the difference from the preset flow rate which is set in advance, a flow rate controller which performs a feedback control on the flow rate of the primary fluid flow channel to a desired value is achieved. (For example, see Patent Document 1).

Patent Document 1: Japanese Unexamined Patent Application Publication No. 5-233068 (see FIG. 1)

DISCLOSURE OF INVENTION

In the pressure sensor described above, specifically in a case of measuring the pressure of liquid, if compressible fluid such as air or gas is stagnated in the pressure introduction flow channel configured to introduce the fluid to be subjected to the pressure measurement from the primary fluid flow channel, accurate pressure measurement is hardly achieved. In other words, since stagnation of slurry solution triggers coagulation of the slurry solution, the growing coagulation makes the pressure measurement impossible at last. Also, in the semiconductor manufacturing process, for example, the coagulated slurry may flow out to cause scratches generated on a wafer. In addition, the stagnation of the fluid remarkably deteriorates the performance of chemical substitution, and may affect the properties other than the performance of the pressure measurement, such that if pure water is flowed after the chemical solution has flowed, the chemical solution can hardly be flowed off and hence it takes time until the resistance value is lowered. Still further, as regards the differential pressure type flow meter using the pressure sensor in the related art, the stagnation of the chemical solution cannot react quickly to the effect of temperature change, which may cause a malfunction.

In other words, in the pressure sensor in the related art, since the pressure detecting unit is arranged at an upper end portion of the pressure introduction flow channel branched in a T-shape upward from the primary fluid flow channel, if the compressible fluid enters the interior of the pressure introduction flow channel, it rises to a pressure-receiving surface. Therefore, the compressible fluid entered the interior of a pressure introduction portion can hardly return to the primary fluid flow channel to be discharged and hence stagnates between the fluid to be subjected to the pressure measurement and the pressure-receiving surface, which may cause various problems on the pressure measurement or the semiconductor process.

In this manner, in a state in which the compressible fluid stagnates on the pressure-receiving surface of the pressure sensor, it is difficult to measure the fluid pressure accurately by the pressure sensor due to the effect of dynamic pressure variations from the fluid flowing in the primary fluid flow channel.

In view of such background, in the pressure sensor having the pressure introduction flow channel branched from the primary fluid flow channel, a structure in which the compressible fluid does not stagnate in the vicinity of the pressure-receiving surface of the pressure sensor in the interior of the pressure introduction portion is desired in order to enable the accurate measurement by the pressure sensor.

In view of such circumstances, it is an object of the present invention to provide a pressure sensor having a structure in which compressible fluid is prevented from stagnating in the vicinity of a pressure-receiving surface of the pressure sensor in the interior of the pressure introduction portion, and a differential pressure type flow meter and a flow rate controller using this pressure sensor.

The present invention employs solutions described below for solving the above-described problem.

A pressure sensor according to the present invention is a pressure sensor including a pressure detecting unit arranged in a pressure introduction flow channel branched in a T-shape upward from a primary fluid flow channel in which fluid to be subjected to pressure measurement flows, in which the pressure introduction flow channel includes an inclined surface extending in a direction to increase an opening area on the side of an inlet port of the fluid on a wall surface on the downstream side in terms of the direction of flow of the fluid.

According to the pressure sensor as described above, since the pressure introduction flow channel includes the inclined surface in the direction to increase the opening area on the side of the inlet port of the fluid on the wall surface on the downstream side in terms of the direction of flow of the fluid, even though the compressible fluid such as air is contained in the fluid, it flows along the inclined surface inclining toward the downstream side without stagnating in the pressure introduction channel.

In the pressure sensor as described above, preferably, the pressure introduction flow channel is formed into a bowl shape which narrows the opening area on the side of the inlet port of the fluid, and the inclined surface is provided on the wall surface on the downstream side in terms of the direction of flow of the fluid in the bowl shape, whereby the surface area of the inlet port of the fluid of the pressure introduction flow channel is reduced so that the measurement error due to the dynamic pressure of the fluid can be reduced, and the inclined surface prevents the stagnation of the compressible fluid so that the pressure measurement of the fluid can be performed further accurately.

The differential pressure type flow meter in the present invention performs flow rate measurement by arranging a pair of the pressure sensors according to Claim 1 or 2 in the primary fluid flow channel in series via an orifice and causing a control unit which receives an input of a signal of a pressure value detected by the both sensors to convert a pressure difference into a flow rate.

According to the differential pressure type flow meter as described above, even though the compressible fluid such as the air is contained in the fluid, the fluid is not stagnated in the pressure introduction channel of the pressure sensors, so that the differential pressure can be detected accurately by the both pressure sensors. Also, since the fluid is not stagnated in the interior of the both pressure sensors and hence a temperature change can be accommodated immediately, the error Caused by a temperature drift of the pressure value due to the temperature change of the fluid can be eliminated. Therefore, the differential pressure type flow meter which performs the flow rate measurement using the both pressure sensors is improved in accuracy in flow rate measurement.

A flow rate controller according to the present invention includes a differential pressure type flow meter performing the flow rate measurement by arranging a pair of the pressure sensors according to Claim 1 or 2 in the primary fluid flow channel in series via an orifice and causing a control unit which receives an input of a signal of a pressure value detected by the both sensors to convert a pressure difference into a flow rate, and a flow rate adjusting valve provided in the primary fluid flow channel and controlled in opening so that the difference between the flow rate measured value of the differential pressure type flow meter and the preset flow rate value determined in advance falls within a predetermined range.

According to the flow rate controller as described above, since the differential pressure can be detected accurately by the pressure sensors, the accuracy in flow rate measurement by the differential pressure type flow meter is improved. Therefore, the flow rate controller having the flow rate control valve configured to be controlled in opening using the flow rate measured value is able to improve the accuracy in flow rate control.

According to the present invention as described above, since the compressible fluid such as air contained in the fluid can be prevented from stagnating in the periphery of the pressure detecting unit, the detection values of the pressure sensors become accurate. Also, the inability of measurement or generation of scratches on the wafer due to coagulation of slurry can be prevented and, in addition, when the differential pressure type flow meter is configured, detection is achieved without occurrence of the malfunction even under the temperature change.

Therefore, remarkable effects such that the flow rate accuracy measured by the differential pressure type flow meter including the pressure sensors as components is improved and, in addition, the flow rate control accuracy of the flow rate controller which performs the opening control of the flow rate control valve using the flow rate measured value measured by the differential pressure type flow meter is improved are achieved.

EXPLANATION OF REFERENCE

Figure 1:
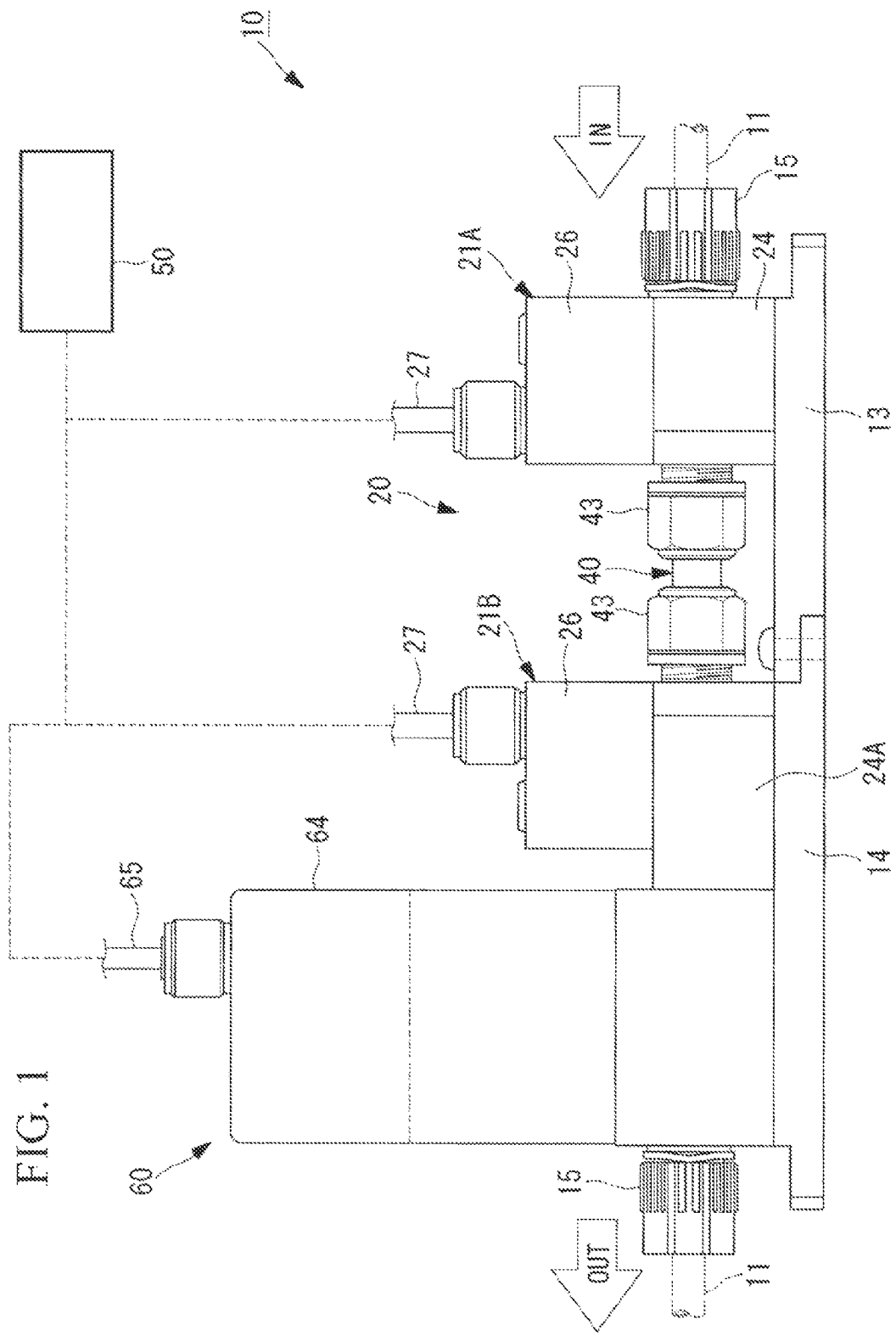
FIG. 1 is a drawing showing a first embodiment of the present invention, and is a front view showing an example of a general configuration of a flow rate controller.

10: flow rate controller
12, 12A-12C: primary fluid flow channel
20: differential pressure type flow meter
21A: pressure sensor (first sensor)
21B: pressure sensor (second sensor)
22, 22A, 22B: pressure introduction flow channel
23: sensor body
24, 24A: body
25: sensor storage space
28, 28A: inclined surface
40: orifice unit
50: control unit
60: flow rate adjusting valve

BEST MODE FOR CARRYING OUT THE INVENTION

An embodiment of a pressure sensor, a differential pressure type flow meter, and a flow rate controller according to the present invention will be described below on the basis of the drawings.

Figure 2:
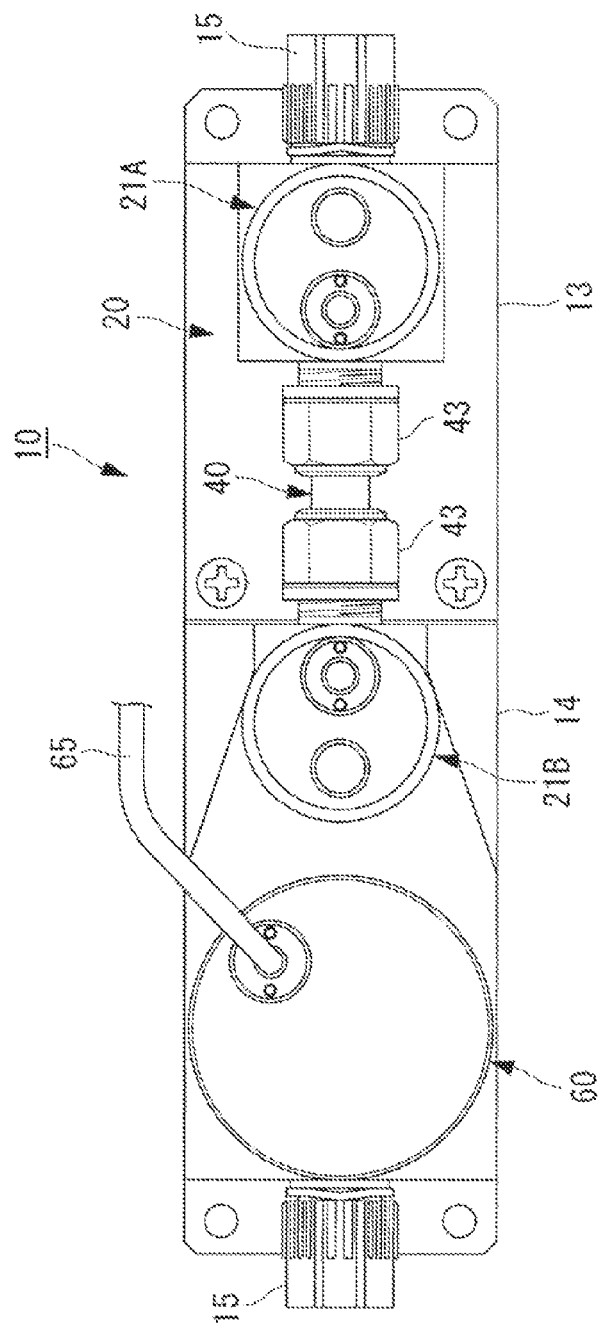
FIG. 2 is a plan view of FIG. 1.
Figure 3:
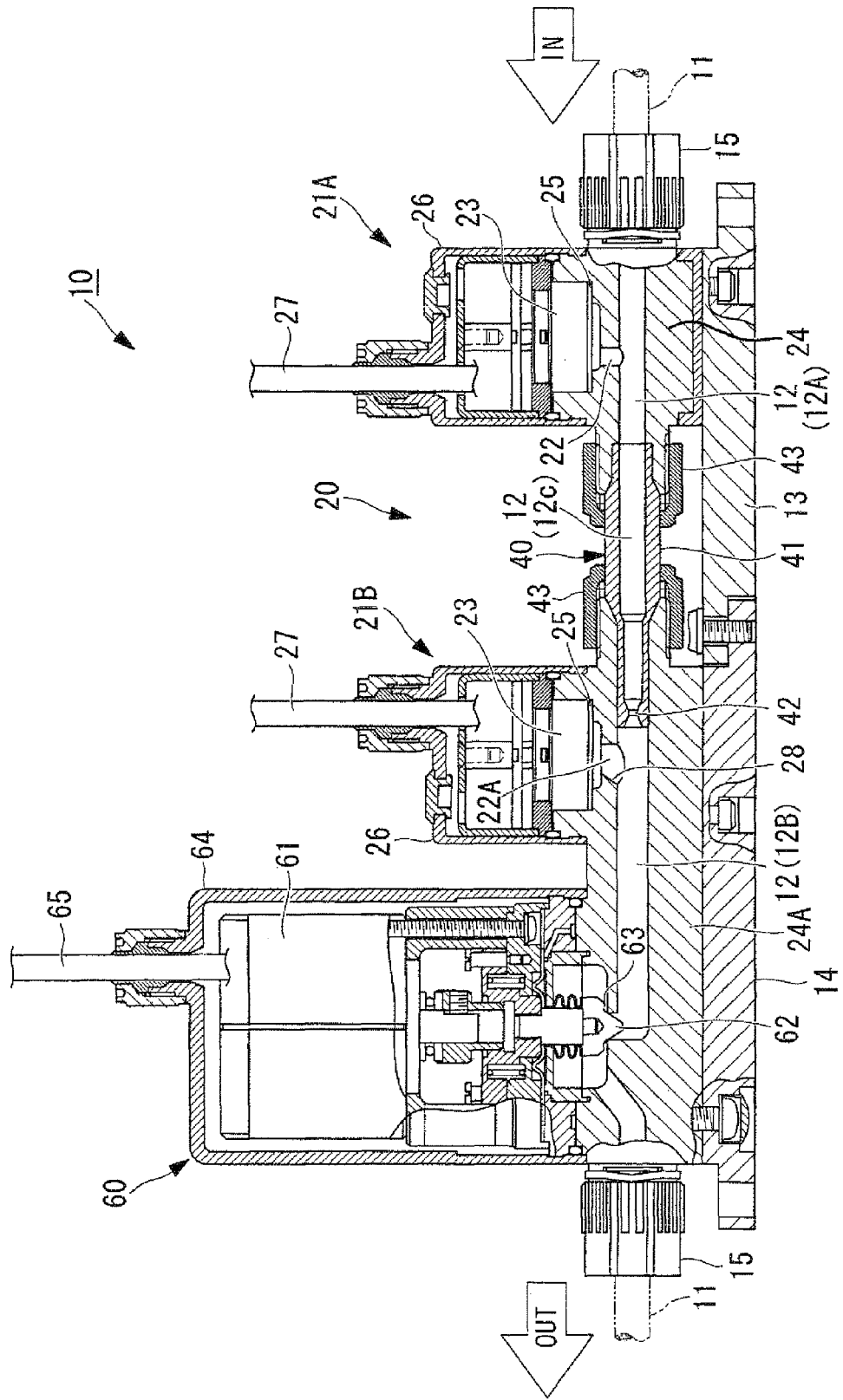
FIG. 3 is a vertical cross-sectional view of FIG. 1.

In the first embodiment shown in FIG. 1 to FIG. 3, FIG. 1 is a front view of a flow rate controller 10, FIG. 2 is a plan view of FIG. 1, and FIG. 3 is a vertical cross-sectional view of FIG. 1. The flow rate controller 10 is a flow rate control apparatus integrated in a pipe 11 which communicates with a primary fluid flow channel 12, described later, and configured to maintain the fluid flow rate of liquid (chemical solution or the like) flowing in the same flow channel constant, and includes a differential pressure type flow meter 20 configured to measure an actual fluid flow rate, and a flow rate adjusting valve 60 configured to be able to control the opening of a valve element. The differential pressure type flow meter 20 is arranged on the upstream side of the flow rate adjusting valve 60 in the direction of flow of the fluid flowing in the primary fluid flow channel 12.

The differential pressure type flow meter 20 has a configuration in which a pair of pressure sensors 21A, 21B are arranged in series via an orifice unit 40. In other words, in the differential pressure type flow meter 20, the fluid pressures being different after having passed through the orifice unit 40 are detected by the both pressure sensors 21A, 21B, and these two pressure values are converted respectively into electric signals and input to a control unit 50. The control unit 50 having received signal input of the pressure values in this manner is able to measure the flow rate of the fluid flowing in the primary fluid flow channel by converting the differential pressure obtained from the two pressure values into the flow rate. In the description given below, the pressure sensor 21A arranged on the upstream side of the orifice unit 40 is referred to as a first sensor, and the pressure sensor 21B arranged on the downstream side is referred to as a second sensor as needed for discrimination.

The configurations of the pressure sensors 21A, 21B are basically the same except for a body and the shape of the pressure introduction flow channel described later, the first sensor 21A on the upstream side will be described below.

The first sensor 21A includes, as shown in FIG. 3 for example, a sensor body (pressure detecting unit) 23 arranged in a pressure introduction flow channel 22 which is branched into a T-shape upward from the primary fluid flow channel 12 in which the fluid to be subjected to the pressure measurement flows. In the illustrated configuration, the pressure introduction flow channel 22 which communicates with a sensor storage space 25 above so as to extend substantially orthogonal to the fluid flow channel 12 formed through the body 24 is provided. The sensor body 23 is not specifically limited as long as it can detect the fluid pressure, but for example, a piezo-type pressure sensor, a capacitance pressure sensor, and a strain gauge pressure sensor are preferable. In this embodiment, the strain gauge pressure sensor is used as the sensor body 23.

A cover 26 is mounted on an upper portion of a body 24 so as to cover the sensor body 23 and accessory components such as a control substrate. Reference numeral 27 in the drawing designates a cable for inputting the electric signals of pressure values detected by the sensor body 23 to the control unit 50.

In contrast, the second sensor 21B is different from the above-described first sensor 21A in that the primary fluid flow channel 12 is formed in a body 24A which is integral with the 60 described later, and in the shape of a pressure introduction flow channel 22A. In other words, the pressure introduction flow channel 22A of the second sensor 21B includes an inclined surface 28 in the direction to expand an opening area on the side of the inlet port of the fluid on a wall surface on the downstream side in terms of the direction of flow of the fluid. The inclined surface 28 is formed by providing inclination on a side wall surface by forming half the pressure introduction flow channel 22A on the downstream side into a substantially truncated conical shape, and the pressure introduction flow channel 22A has a flow channel cross-sectional area on the lower side which communicates with the primary fluid flow channel 12 and corresponds to the side of the fluid inlet port larger than the side of the fluid outlet port which communicates with the sensor storage space 25. Other configurations are the same as the first sensor 21A described above.

Incidentally, although the inclined surface 28 is provided only on the second sensor 21B in the configuration example described above, it is needless to say that the inclined surface 28 is preferably provided on both the first sensor 21A and the second sensor 21B.

The orifice unit 40 includes an orifice body 41, which is a cylindrical member installed between the first sensor 21A and the second sensor 212. The orifice body 41 is formed with a primary fluid flow channel 12C which connects the primary fluid flow channels 12A, 12B formed in the bodies 24, 24A of the first sensor 21A and the second sensor 21B with the same flow channel cross-sectional area. Also, an orifice flow channel 42 having a reduced flow channel cross-sectional area in comparison with that of the primary fluid flow channel 12C is formed at an adequate position of the primary fluid flow channel 12C. In the illustrated example, the flow channel cross-sectional area is reduced step by step from the primary fluid flow channel 12C to the orifice flow channel 42 having a smallest diameter.

The orifice body 41 is inserted at one end thereof on the upstream side having the same flow channel cross-sectional area as the primary fluid flow channels 12A, 12B into the interior of the body 24 of the first sensor 21A, and is inserted at the other end thereof on the downstream side having the orifice hole 42 into the interior of the primary fluid flow channel 12B of the second sensor 21B. The both ends of the orifice body 41 are fixed to the bodies 24, 24A by a joint structure using cap nuts 43.

The flow rate adjusting valve 60 is installed on the body 24A which is common with the pressure sensor 21B in the primary fluid flow channel 12 on the downstream side of the pressure sensor 21B. The flow rate adjusting valve 60 performs opening control so that the difference between the flow rate measured value of the differential pressure type flow meter 20 and the preset flow rate determined in advance falls within a predetermined range.

The illustrated flow rate adjusting valve 60 employs a configuration in which a needle (valve element) 62 is moved upward and downward by a drive mechanism having a motor 61 such as a stepping motor to cause the needle 62 to open and close to be at a desired opening position with respect to a valve seat 63. However, the drive mechanism or the structure of valve element of the flow rate adjusting valve 60 is not specifically limited as long as it is capable of adjusting the opening of the needle 62. Reference numeral 64 in the drawing designates a cover for covering the motor 61 or the like, reference numeral 65 designates a cable connected to the motor 61, and reference numeral 120 designates a primary fluid flow channel which serves as an outlet port of the fluid.

The above-described first sensor 21A is fixed to and supported by a base member 13 via the body 24. In the same manner, the above-described second sensor 21B and the flow rate adjusting valve 60 are fixed to and supported by a base member 14 via the common body 24A. Then, the bodies 24, 24A are connected by the orifice unit 40, and the base members 13, 14 are integrally connected, so that the flow rate controller 10 having the differential pressure type flow meter 20 and the flow rate adjusting valve 60 is configured.

Reference numeral 15 in the drawing is a cap nut having a joint structure for connecting and fixing the pipe 11 to the bodies 24, 24A.

The flow rate controller 10 configured in this manner inputs a desired fluid flow rate (hereinafter, referred to as "preset flow rate) Qr which is desired to be maintained constant into the control unit 50 to store therein before starting an operation. The control unit 50 activates the needle 62 of the flow rate adjusting valve 60 so as to be a valve opening corresponding to the input preset flow rate Qr to set an initial opening. Then, when the fluid is flowed to the flow rate controller 10, the differential pressure type flow meter 20 measures a flow rate of actually flowing fluid (hereinafter, referred to as "measured flow rate") Qf and inputs the same to the control unit 50, so that the flow rate difference $\Delta Q$ between the measured flow rate Qf and the preset flow rate Qr ($\Delta Q = Qr - Qf$) is obtained and compared in the interior of the control unit 50.

The above-described flow rate difference $\Delta Q$ is compared with an allowable range q set in advance. Then, when an absolute value of the flow rate difference $\Delta Q$ is smaller than the allowable range q ($\Delta Q < q$), it is determined that the desired preset flow rate Qr is flowing, and the flow rate adjusting valve 60 is maintained in the initial opening.

In contrast, when the flow rate difference $\Delta Q$ described above is a positive value ($Qr > Qf$), and the absolute value of the flow rate difference $\Delta Q$ is not smaller than the allowable range q ($\Delta Q \geq q$), it is determined that the measured flow rate Qf is in a state of being in the small quantity side which does not satisfy the desired preset flow rate Qr. Therefore, the needle 62 of the flow rate adjusting valve 60 is activated in the direction of opening larger than the initial opening in order to increase the measured flow rate Qf.

In addition, when the flow rate difference ΔQ described above is a negative value (Qr<Qf), and the absolute value of the flow rate difference ΔQ is not smaller than the allowable range q (ΔQ≥q), it is determined that the measured flow rate Qf is in a state of being in the large quantity side which does not satisfy the desired preset flow rate Qr. Therefore, the needle 62 of the flow rate adjusting valve 60 is activated in the direction of opening smaller than the initial opening in order to reduce the measured flow rate Qf.

In this manner, the flow rate controller 10 performs feedback control so that the absolute value of the flow rate difference ΔQ obtained by comparison with respect to the preset flow rate Qr on the basis of the measured flow rate Qf inputted from the differential pressure type flow meter 20 satisfies a predetermined allowable range q, so that the fluid flow rate flowing in the primary fluid flow channel 12 can be maintained constant.

The second sensor 21B as a component of the differential pressure type flow meter 20 described above includes the inclined surface 28 on the wall surface which defines the pressure introduction flow channel 22A. The inclined surface 28 is formed by inclining a wall surface on the downstream side in terms of the direction of flow of the fluid so as to expand the opening area on the side of the fluid inlet port toward the downstream side, and hence even though the compressible fluid such as air is contained in the fluid flowing in the primary fluid flow channel 12B, the fluid flows toward the downstream side without being stagnated in the interior of the pressure introduction flow channel 22A. In other words, even when the compressible fluid contained in the fluid flowing in the primary fluid flow channel 12B enters the interior of the pressure introduction flow channel 22A, the compressible fluid is flowed out easily along the inclined surface 28 which expands the opening area of the inlet port on the downstream side in terms of the direction of flow of the fluid as if it is attracted by the flow, so that the stagnation between the sensor body 23 and the fluid in the interior of the pressure introduction flow channel 22A branched into a T-shape upward from the primary fluid flow channel 12B is prevented or restrained.

Therefore, the compressible fluid can hardly enter the interior of the sensor storage space 25 where a pressure-receiving surface of the sensor body 23 is present, so that an event such that the pressure measurement becomes unstable because the compressible fluid is stagnated between the pressure-receiving surface of the sensor body 23 and the liquid, and hence the pressure is affected by the dynamic pressure variation from the fluid flowing in the primary fluid flow channel 12B is prevented. In other words, since the pressure-receiving surface of the sensor body 23 is able to receive the pressure (static pressure) of the fluid flowing in the primary fluid flow channel 12B directly, the accurate and stable pressure measurement is achieved.

Then, when the pressure measurement by the second pressure sensor 21B which constitutes the differential pressure type flow meter 20 is stabilized, the differential pressure obtained by the pair of pressure sensors is also stabilized, so that the accuracy or the reliability of the flow rate measured value obtained by converting the differential pressure is improved. As regards the first pressure sensor 21A and the second pressure sensor 21B which constitute the differential pressure type flow meter 20, if both of them are provided with the inclined surface 28, the accuracy or the reliability of the flow rate measured value (measured flow rate Qf) is further improved.

In addition, as regards the flow rate controller 10 which performs the opening control of the flow rate adjusting valve 60 using the measured value of the differential pressure type flow meter 20 described above, when the accuracy or the stability of the flow rate measured value (measured flow rate Qf) is improved, the fluid flow rate control accuracy of the measured flow rate Qf flowing in the primary fluid flow channel 12 is improved.

Figure 4:
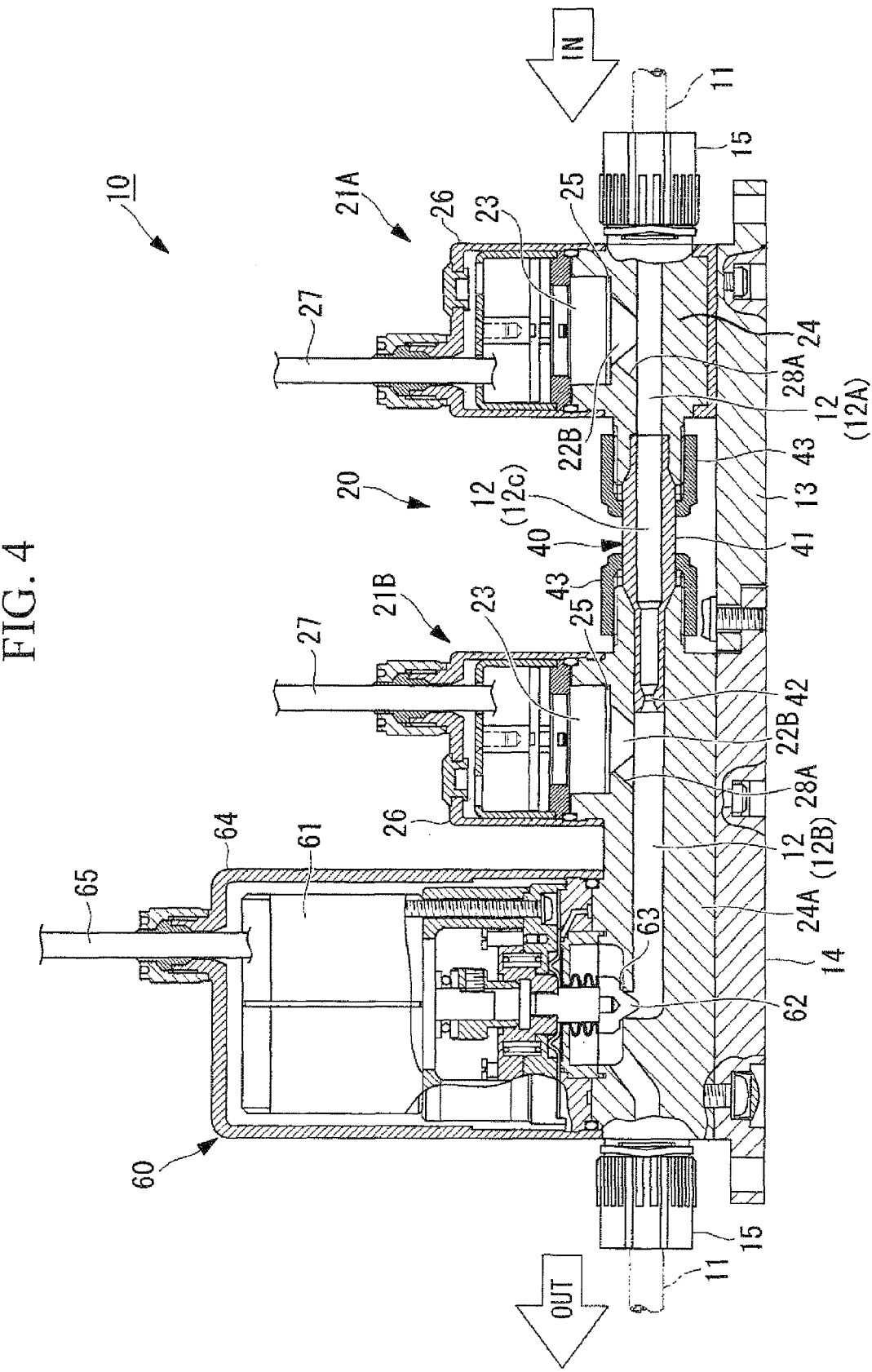
FIG. 4 is a drawing showing a second embodiment of the present invention, and is a vertical cross-sectional view showing an example of an internal structure of the flow rate controller.
Figure 5A:
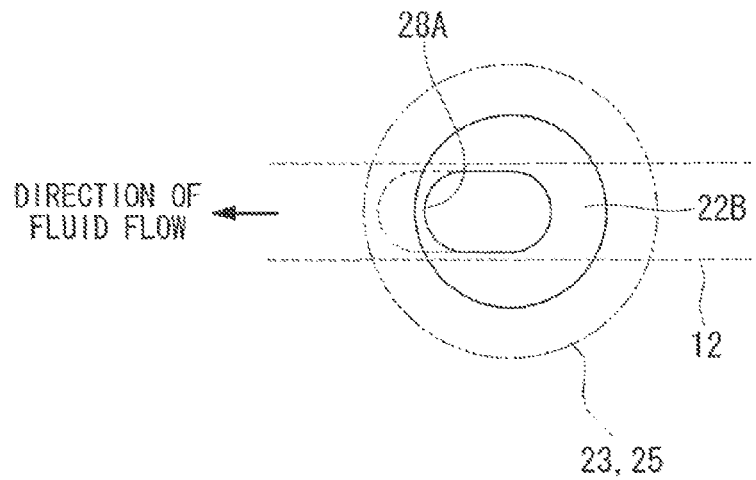
FIG. 5A is a drawing showing a pressure introduction flow channel and an inclined surface in FIG. 4, and is a plan view viewed from above on the side of a sensor space.
Figure 5B:
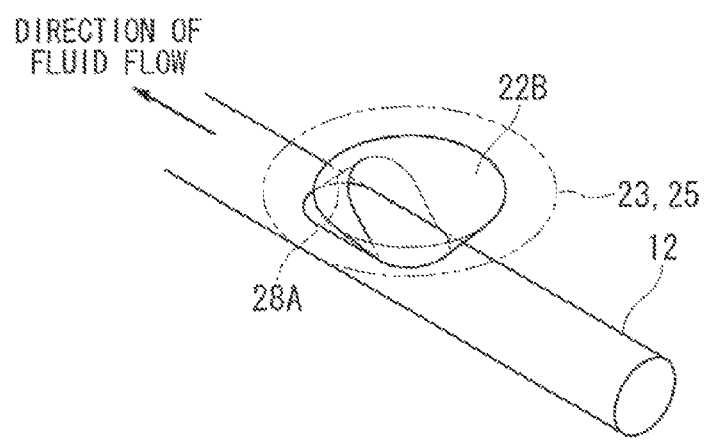
FIG. 5B is perspective view showing the pressure introduction flow channel and the inclined surface in FIG. 4.

Subsequently, a second embodiment of the present invention will be described on the basis of FIG. 4, FIG. 5A and FIG. 5B. In the following description, the same components as those in the first embodiment described above are designated by the same reference numerals, and detailed description thereof will be omitted.

In this embodiment, the pair of pressure sensors 21A, 21B which constitute the differential pressure type flow meter 20 both are provided with an inclined surface 28A in a pressure introduction flow channel 22B. The pressure introduction flow channel 22B in this case is formed into a bowl shape which narrows the opening area on the side of the inlet port where the fluid branched in a T-shape from the primary fluid flow channel 12 is introduced, and the inclined surface 28A is provided on the wall surface on the downstream side in terms of the direction of flow of the fluid in the pressure introduction flow channel 22B. The inclined surface 28A is formed, as shown in FIGS. 5A, 5B for example, by applying a working on the wall surface of the pressure introduction flow channel 22B on the downstream side in terms of the direction of flow of the fluid to remove the wall surface obliquely toward the downstream side in terms of the direction of flow of the fluid using a punching tool or the like from the sensor storage space 25 side toward the primary fluid flow channel 12.

In other words, since the pressure introduction flow channel 22B in this embodiment is formed in such a manner that the inlet opening area on the side of the primary fluid flow channel 12 is narrower than the outlet opening area on the side of the sensor storage space 25, it has a shape which allows the compressible fluid in the fluid flowing in the primary fluid flow channel 12 to flow hardly into the interior of the pressure introduction flow channel 22B and the sensor storage space 25.

In addition, since the pressure introduction flow channel 22B described above includes the inclined surface 28A formed on the wall surface on the downstream side in terms of the direction of flow of the fluid, the compressible fluid entered from the inlet opening having the narrow opening area flows out toward the downstream side without stagnating in the pressure introduction flow channel 22B by being guided by the inclined surface 28A.

Therefore, even when the compressible fluid contained in the fluid flowing in the primary fluid flow channel 12 enters the interior of the pressure introduction flow channel 22B, the compressible fluid is flowed out easily along the inclined surface 28A which enlarges the opening area of the inlet port on the downstream side in terms of the direction of flow of the fluid, so that the stagnation between the sensor body 23 and the fluid in the interior of the pressure introduction flow channel 22B branched into a T-shape upward from the primary fluid flow channel 12 is prevented or restrained. Therefore, the compressible fluid can hardly enter the interior of the sensor storage space 25 where the pressure-receiving surface of the sensor body 23 is present, so that an event such that the pressure measurement becomes unstable because the compressible fluid is stagnated between the pressure-receiving surface of the sensor body 23 and the liquid, and hence the pressure is affected by the dynamic pressure variation from the fluid flowing in the primary fluid flow channel 12 is prevented. In other words, since the pressure-receiving surface of the sensor body 23 is able to receive the pressure (static pressure) of the fluid flowing in the primary fluid flow channel 12B directly, the accurate and stable pressure measurement is achieved.

Even when the configuration according to the second embodiment described above is employed, the pressure measurement by the first pressure sensor 21A and the second pressure sensor 21B which constitute the differential pressure type flow meter 20 is accurate and stable, whereby the differential pressure obtained by the both pressure sensors 21A, 21B is also stabilized, so that the accuracy or the reliability of the measured flow rate Qf obtained by converting the differential pressure is improved.

In addition, as regards the flow rate controller 10 which performs the opening control of the flow rate adjusting valve 60 using the measured value of the differential pressure type flow meter 20 described above, when the accuracy or the stability f the measured flow rate Qf is improved, the fluid flow rate control accuracy of the measured flow rate Qf flowing in the primary fluid flow channel 12 is improved.

In this manner, according to the present invention as described above, since the compressible fluid such as air contained in the fluid can be prevented from stagnating in the periphery of the sensor body 23 which is the pressure detecting unit, the detection values of the pressure sensors 21A, 21B become accurate. Therefore, the flow rate accuracy measured by the differential pressure type flow meter 20 including the pressure sensors 21A, 21B as components is improved and, in addition, the flow rate control accuracy of the flow rate controller 10 which performs the opening control of the flow rate control valve 60 using the flow rate measured value (measured flow rate Qf) measured by the differential pressure type flow meter 20 is improved.

The present invention is not limited to the embodiments described above, and may be modified as needed without departing the scope of the present invention.

The invention claimed is:

1. A pressure sensor comprising:
a pressure detecting unit arranged in a pressure introduction flow channel branched in a T-shape upward from a primary fluid flow channel in which fluid to be subjected to pressure measurement flows,
wherein the pressure introduction flow channel includes an inclined surface extending in a direction to increase an opening area on a side of an inlet port of the pressure introduction flow channel on a wall surface of the pressure introduction flow channel located on a downstream side in terms of the direction of flow of the fluid of the primary fluid flow channel, and
wherein the entirety of the pressure introduction flow channel is formed into a bowl shape which narrows the opening area on the side of the inlet port of the pressure introduction flow channel, and the inclined surface is provided on the wall surface of the pressure introduction flow channel located on the downstream side in terms of the direction of flow of the fluid of the primary fluid flow channel.

2. A differential pressure type flow meter configured to perform flow rate measurement by arranging a pair of the pressure sensors according to claim 1 in the primary fluid flow channel in series via an orifice and causing a control unit which receives an input of a signal of a pressure value detected by the both sensors to convert a pressure difference into a flow rate.

3. A flow rate controller comprising:
a differential pressure type flow meter configured to perform the flow rate measurement by arranging a pair of the pressure sensors according to claim 1 in the primary fluid flow channel in series via an orifice and causing a control unit which receives an input of a signal of a pressure value detected by the both sensors to convert the pressure difference into the flow rate; and
a flow rate adjusting valve provided in the primary fluid flow channel and controlled in opening so that the difference between the flow rate measured value of the differential pressure type flow meter and the preset flow rate value determined in advance falls within a predetermined range.

\* \* \* \* \*

UNITED STATES PATENT AND TRADEMARK OFFICE
CERTIFICATE OF CORRECTION

PATENT NO.        : 8,590,561 B2                                                    Page 1 of 1
APPLICATION NO.   : 12/664969
DATED             : November 26, 2013
INVENTOR(S)       : Hiroki Igarashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 773 days.

Signed and Sealed this
Twenty-second Day of September, 2015

Michelle K. Lee
*Director of the United States Patent and Trademark Office*